J. D. WILLIAMSON, Jr.
SAFETY FRICTION CLUTCH.
APPLICATION FILED JAN. 25, 1910.
971,335.
Patented Sept. 27, 1910.
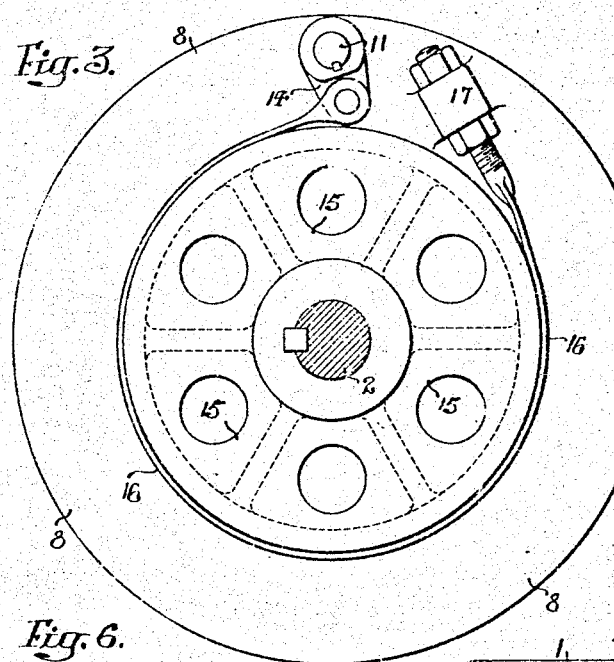
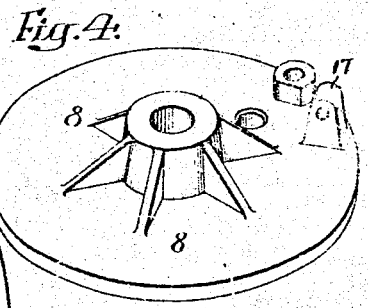
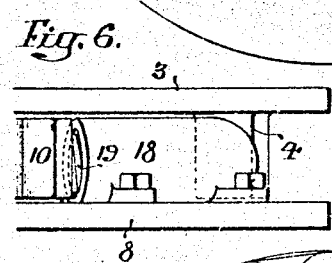
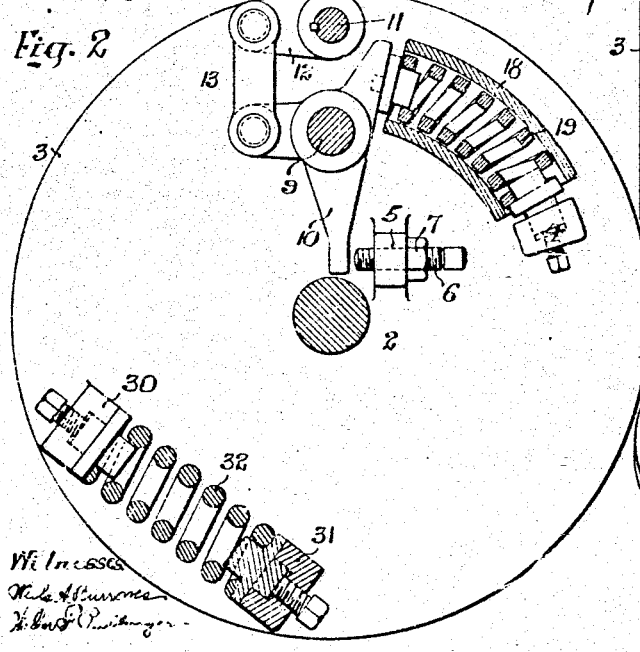
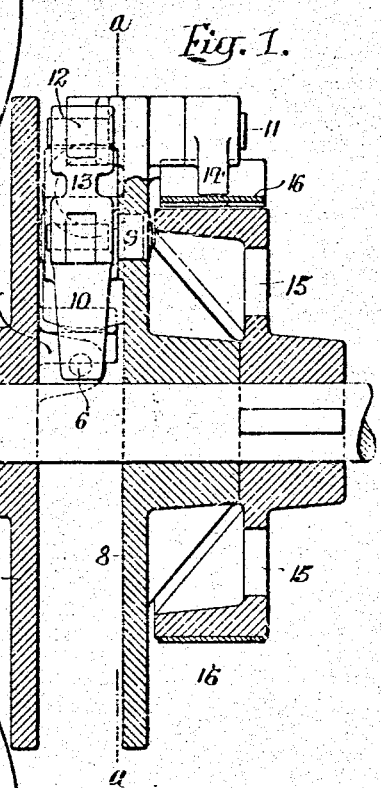
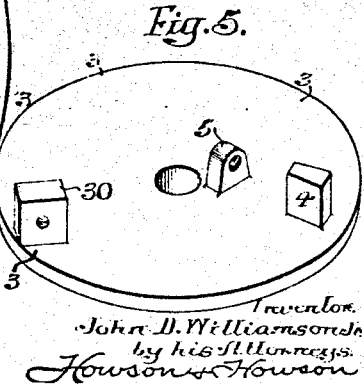

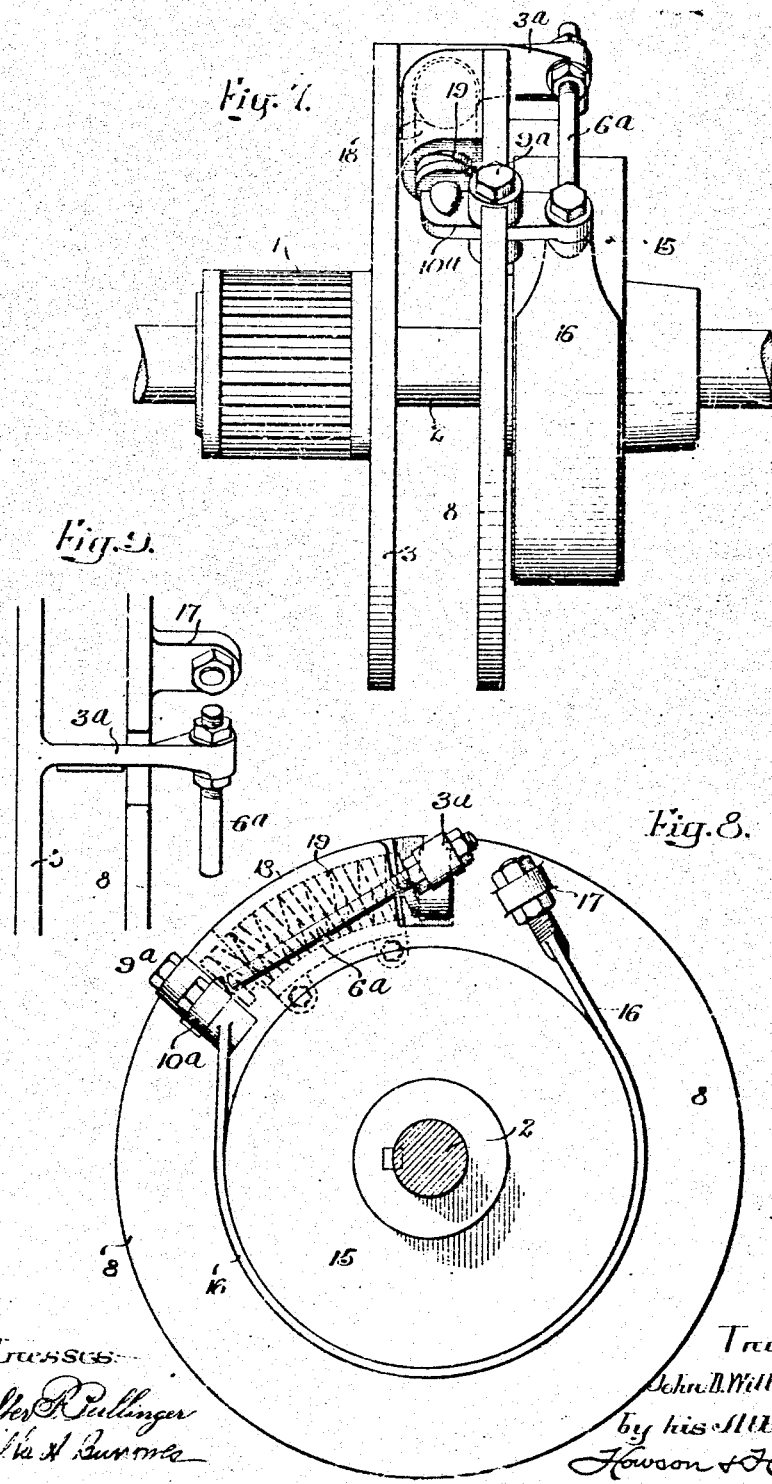

UNITED STATES PATENT OFFICE.

JOHN D. WILLIAMSON, JR., OF PHILADELPHIA, PENNSYLVANIA, ASSIGNOR TO WILLIAMSON BROS. CO., OF PHILADELPHIA, PENNSYLVANIA, A CORPORATION OF PENNSYLVANIA.

SAFETY FRICTION-CLUTCH.

971,335.  Specification of Letters Patent.  Patented Sept. 27, 1910.

Application filed January 25, 1910. Serial No. 539,921.

*To all whom it may concern:*

Be it known that I, JOHN D. WILLIAMSON, Jr., a citizen of the United States, residing in Philadelphia, Pennsylvania, have invented certain Improvements in Safety Friction-Clutches, of which the following is a specification.

One object of my invention is to provide a clutch for coupling a driving to a driven member, which shall transmit a predetermined torque from one of said members to the other, but which when this torque is exceeded, will automatically act to permit or cause the driven member to slip relatively to the driving member.

Another object of the invention is to provide a novel form of automatically acting friction clutch so designed as to automatically limit the torque transmitted between the driving and driven members, between which it is coupled.

These objects and other advantageous ends I secure as hereinafter set forth, reference being had to the accompanying drawings, in which;—

Figure 1, is a vertical section illustrating the detail construction of a clutch constructed according to my invention; Fig. 2, is a vertical section on the line *a—a*, Fig. 1; Fig. 3, is an end elevation of the clutch; Figs. 4 and 5 are perspective views on a reduced scale illustrating the construction of certain parts of my device; Fig. 6, is a fragmentary plan illustrating the construction of the spring case and its associated parts; Figs. 7 and 8 are respectively a side and an end elevation of a modified form of my invention, and Fig. 9, is a fragmentary plan illustrating one of the details of the clutch shown in Figs. 7 and 8.

In the above drawings, 1 represents a gear or other device to which is ordinarily connected the load to be driven, and 2 represents a shaft loosely supporting said gear and designed to be connected to any suitable source of power. The gear has connected with it (in the present case, integrally) a disk 3 having on one face two projecting lugs 4 and 5, in the latter of which is mounted an adjustable bolt or set screw 6 held in any adjusted position by means of a jam nut 7. Also loosely mounted on the shaft 2 is a second disk 8, on one of whose faces is mounted a pivot pin 9 which extends toward the disk 3 and carries a three armed lever 10. Also mounted on the disk 8 is a short shaft or spindle 11, projecting on both faces thereof and having fixed on its end adjacent to the lever 10, an arm 12 connected to one of the arms of said lever by a link 13. On the other end of this shaft 11 and on the other face of the disk 8, is a second arm 14.

The shaft 2 has keyed to it a friction wheel 15 designed to receive a friction band 16 which has one of its ends connected to the arm 14 and its other end adjustably fixed to a lug 17 projecting from the disk 8. This latter has mounted between itself and the disk 3, a casing 18 in which is a spring 19 confined between the lug 4 and the second of the arms of the lever 10; the third arm of said lever extending so as to be capable of being engaged by the end of the bolt 6 under certain conditions of operation. If the shaft 2 and wheel 15 be turned in the direction of the arrow, Fig. 3, power is transmitted to the band 16, lug 17, disk 8 and stud 9 to one arm 10ª of the lever 10. The pressure against this lever arm causes said lever to turn on said stud and through the link 13 and arm 12, also turns the shaft or spindle 11 to a greater or less extent, thereby moving the second arm 14 on said spindle in such a direction as to cause the friction band 16 to more tightly grip the friction wheel 15. The power for driving the load is thus transmitted from the lever 10 to spring 19, lug 4, and disk 3 to the gear 1. As the load transmitted from the shaft 2 to said gear is increased, the spring 19 is compressed to an amount depending on said load, and the lever 10 is further turned on its pivot, thereby causing the friction band 16 to more tightly grip the friction wheel 15, so that it is enabled to transmit such increased load without slipping. After said load has reached a certain amount, however, the lever 10 has so far turned on its pivot and has also bodily approached the spring 19, as to cause its lowermost arm to come into engagement with the end of the bolt 6, thus making further tightening of the friction band an impossibility. Thereafter, if the load applied to the gear be increased, the friction band 16 will slip on the wheel 15, since the bolt will cause such a turning of the lever 10 as will slack said band. As soon, however, as the torque transmitted from the driving to the driven member falls to the predetermined point, the friction band ceases to slip and the load is transmitted as before. If the load to be transmitted is larger than it is desired to carry through the spring 19, I may place another lug 30 on the disk 3 and a corresponding lug 31 on the disk 8 at the same time mounting a spring 32 of the proper dimensions between said two lugs. In this case the spring 32 serves to transmit the major portion of the load while the controlling spring 19 is so proportioned as to yield sufficiently at the predetermined additional load to cause operation of the lever 10, as above described. It is obvious that any desired number of springs 32 may be used to satisfactorily transmit the main part of any desired load, or they may be omitted altogether when the spring 19 is sufficient for this purpose. By varying the position of the bolt 6, it is possible for the device to be set so that it will slip at any desired load within the limits for which it is designed, thereby preventing possible injury to the apparatus to which it transmits power, or to any of the driving mechanism.

In that form of my invention shown in Figs. 7 to 9 inclusive, I have simplified the construction by providing the disk 3 with an arm 3ᵃ mounted adjacent to its periphery and projecting substantially parallel with the shaft 2 over to the friction band wheel 15. In addition I mount on the disk 8, a lever 10ᵃ in such a position that it also extends substantially parallel to the shaft 2 and is held in position by a radially placed fulcrum bolt 9ᵃ. One end of this lever 10ᵃ is connected to one end of the friction band 16, whose other end as before is connected to a lug 17 on the disk 8. The second end of the lever projects between the two disks 3 and 8 and has mounted between it and the arm 3ᵃ the spring 19, preferably though not necessarily, provided with a casing 18 supported in any suitable manner. As previously noted, the arm 3ᵃ projects across the disk 8 so that it extends over the friction wheel 15 and this projecting end carries an adjustable abutment 6ᵃ so mounted and proportioned as to be capable of engaging the friction band end of the lever 10ᵃ under predetermined conditions.

With the above described arrangement of parts, the load, as before, is designed to be applied to the disk 3, and for this purpose the pinion 1 is directly engaged by the driven member. The source of power is connected to the shaft 2 and under operating conditions it is obvious that the turning of the wheel 15 causes pressure to be exerted through the band 16, lug 17; disk 8 and fulcrum pin 9ᵃ upon the lever 10ᵃ. One arm of said lever is thus caused to press against the spring 19, thereby transmitting the power through it to the disk 3 and gear 1. The compression of the spring causes the lever to turn upon its fulcrum pin 9ᵃ so as to tighten the friction band 16 upon the friction wheel 15, thereby making said band grip the wheel as before described. As the load increases, the lever 10ᵃ turns further on its fulcrum pin to tighten the band, until finally when it has both turned and moved bodily toward said spring to the predetermined amount, its end connected to the band 16 comes into engagement with the previously adjusted abutment formed by the set screw 6ᵃ. Thereafter any further increase in the load applied to the gear 1 causes the friction wheel 15 to slip relatively to the band 16, since this latter cannot be further tightened, by reason of the action of the set screw 6ᵃ, which acts to cause a slacking off of said band.

I claim:—

1. The combination in a power transmitting clutch of a driving and a driven member; a friction band operative on one member; and means for automatically tightening said band in proportion to the load applied.

2. The combination in a power transmitting clutch of a driving and a driven member; a friction band operative on one member; and means for tightening said band in proportion to the load applied; with means for limiting the possible amount of tightening of said band.

3. The combination in a power transmitting clutch of a driving and a driven member; a friction band operative on one of said members; with means for connecting said band to the other member; said means including a lever having one arm operatively connected to said band and a second arm in position to be acted on by said second member.

4. The combination in a power transmitting clutch of a driving and a driven member; a friction band operative on one of said members; means for connecting said band to the second member; the same including a lever having one arm operatively connected to said band and a second arm in position to be acted on by said second member; with means for limiting the possible turning of said lever.

5. The combination in a power transmitting clutch of a driving and a driven member; a lever mounted on one of said members; a friction band operative on the second member; means for operatively connecting the lever to the friction band; and a second structure on the first member capable of acting on said lever, for limiting the movement thereof.

6. The combination in a power transmitting clutch of a friction wheel; a friction band operative thereon; a structure to which one end of the friction band is attached; a shaft mounted in said structure having an arm connected to the second end of said band; a lever having one arm operatively connected to said shaft; with a member connected to a source of power and operative upon a second arm of said lever to transmit power thereto.

7. The combination in a power transmitting clutch of a friction wheel; a friction band operative thereon; a structure to which one end of the friction band is attached; a shaft mounted in said structure and having an arm connected to the second end of said band; a lever having one arm operatively connected to said shaft; with a member connected to a source of power and operative upon a second arm of said lever to transmit power thereto; said member also having means for limiting the movement of the lever when power is applied thereto.

8. The combination in a power transmitting clutch of a driving and a driven member; a friction device capable of transmitting power from one of said members to the other; and adjustable means for limiting the amount of torque transmitted by said friction device.

9. The combination in a power transmitting clutch of a member having a friction surface; a friction element mounted to co-act with said surface; a structure carrying a lever having one of its arms connected to said friction element; and a second member having a portion engaging one of the arms of the lever to transmit power thereto, and also provided with an adjustable bolt for limiting the amount of movement of the lever.

10. The combination of a member having two projecting lugs; a shaft supporting said member; a friction wheel fixed to said shaft; a disk loose on the shaft; a spindle carried by said disk; arms on said spindle; a friction band having one end connected to the disk and the other end connected to one of the arms on the spindle; a lever mounted on the disk having one of its arms connected to a second arm on the spindle; a spring between one of the lugs of said member and a second arm of the lever; and a bolt mounted in the second lug on the member so as to engage a third arm of the lever.

11. The combination in a power transmitting clutch of a driving and a driven member; means including a controlling spring for limiting the torque transmitted between said members; and a load transmitting spring also connected between the members.

12. The combination in a power transmitting clutch of a driving and a driven member; a friction wheel connected to one of the members; a friction band operative thereon; means including a controlling spring connected between the friction band and the second of the members for limiting the load transmitted by said band; and a power transmitting spring also connected between the band and the second member.

13. The combination in a power transmitting clutch of two disks; a friction wheel; a friction band operative on said wheel and connected to one of the disks; a lever mounted on said latter disk and connected to one end of the friction band; a controlling spring mounted between said lever and the other disk; and a power transmitting spring mounted between the two disks.

In testimony whereof, I have signed my name to this specification, in the presence of two subscribing witnesses.

JOHN D. WILLIAMSON, Jr.

Witnesses:
WILLIAM E. BRADLEY,
WM. A. BARR.